(12) United States Patent
Bryla et al.

(10) Patent No.: US 6,590,971 B1
(45) Date of Patent: Jul. 8, 2003

(54) AUTOMATIC CALL DISTRIBUTION SYSTEM CONTACT ROUTING WITH MEDIA-PORT

(75) Inventors: James Bryla, Naperville, IL (US); Paul Fischer, Downers Grove, IL (US); Darryl Hymel, Batavia, IL (US)

(73) Assignee: Rockwell Electronic Commerce Technologies LLC, Wood Dale, IL (US)

( * ) Notice: Subject to any disclaimer, the term of this patent is extended or adjusted under 35 U.S.C. 154(b) by 0 days.

(21) Appl. No.: 09/516,074

(22) Filed: Mar. 1, 2000

(51) Int. Cl.[7] .......................... H04L 12/66; G06F 13/00
(52) U.S. Cl. ........................ 379/265.02; 379/265.09
(58) Field of Search ................ 379/265.01–265.14, 379/266.01–266.1, 309; 709/202

(56) References Cited

U.S. PATENT DOCUMENTS

| | | | | |
|---|---|---|---|---|
| 5,140,611 A | | 8/1992 | Jones et al. ................ 375/7 |
| 5,268,903 A | | 12/1993 | Jones et al. ............... 370/110.1 |
| 5,335,269 A | | 8/1994 | Steinlicht ..................... 379/266 |
| 5,365,581 A | | 11/1994 | Baker et al. ................. 379/196 |
| 5,400,327 A | | 3/1995 | Dezonno ..................... 370/62 |
| 5,999,965 A | * | 12/1999 | Kelly .......................... 709/202 |
| 6,175,562 B1 | * | 1/2001 | Cave ........................... 370/352 |
| 6,363,335 B1 | * | 3/2002 | Monroe et al. ................ 703/21 |
| 6,377,568 B1 | * | 4/2002 | Kelly .......................... 370/352 |
| 6,449,260 B1 | * | 9/2002 | Sassin et al. .......... 379/265.01 |

* cited by examiner

Primary Examiner—William J Deane
(74) Attorney, Agent, or Firm—Welsh & Katz, Ltd.

(57) ABSTRACT

Method and apparatus for routing a non-circuit switched contact to an agent in a circuit switched telephony-based automatic call distribution (ACD) system, without using a voice port for the external contact. A media-port is used to emulate the voice port, permitting the routing of the non-circuit switched contact through the telephony-based ACD system.

28 Claims, 3 Drawing Sheets

AUTOMATIC CALL DISTRIBUTION SYSTEM CONTACT ROUTING WITH MEDIA-PORT

BACKGROUND AND SUMMARY

The present invention relates to adapting an automatic call distribution (ACD) system designed for routing telephone calls, to allow the routing of non-circuit switched contacts.

ACD systems are typically used to distribute telephone calls among a group of agents of an organization. However, ACD systems may be used to distribute contacts under any of a number of different formats. In a first instance, a contact may be a telephone call received from (or placed through) a public switched telephone network (PSTN). A contact also may be a voice path based upon packet data transferred through a computer network such as the Internet using web telephony. Alternatively, a contact may be any communication such as an e-mail, a facsimile, a video, or a web-site inquiry received through the Internet, etc. Thus, ACD systems are transaction processing systems which can handle one or more of a wide variety of these contact types.

An organization can disseminate a single telephone number, URL or e-mail address, for example, to customers and to the public in general as a means of contacting the organization. As contacts are directed to the organization from the PSTN or the Internet, the ACD system can direct the contacts to the organization's agents based upon some algorithm. For example, where all agents are considered equal, the ACD may distribute a contact based on which agent has been idle the longest time. Of course, there are many other possible ways to select an agent, or a subgroup of agents from whom an available one will be selected.

The ACD system can be provided with any number of routing mechanisms for establishing call paths between callers and agents. In some systems, a first path may be established through a circuit switched voice port, such as for calls from the PSTN. An alternative path may be a data link (such as over a Local Area Network (LAN)) such as for an e-mail received through a computer network such as the Internet.

Control of the switching and communications with a database and with an external network such as a PSTN may, for example, be accomplished generally as described in U.S. Pat. Nos. 5,268,903 and 5,140,611, both to Jones et al. which are hereby incorporated by reference. Routing of calls to agents may, for example, be accomplished generally as described in U.S. Pat. No. 5,335,269 to Steinlicht, U.S. Pat. No. 5,365,581 to Baker et al., and U.S. Pat. No. 5,400,327 to Dezonno, which are hereby incorporated by reference.

Many existing ACD systems were created with a focus on circuit switched telephone communications, and other contact formats are being incorporated into the system as the need arises. However, there can be a data link with most agents even if many agents handle only circuit switched telephone calls. For example, it may be important for an agent to have ready access to customer files in systems associated with service organizations, where many calls are received and handled by many agents. A database is maintained of existing customer files, which may be displayed on agent terminals as the agents converse with specific customers.

In a typical ACD system, selected portions of memory are assigned to the agents who are logged-on to handle contacts, and selected portions of memory are assigned to circuit switched telephone trunk lines for communication with external sources. In routing a contact with an external source, the ACD establishes a relationship between a portion of memory assigned to an external line with a portion of memory assigned to an agent. In a typical ACD system, a selected portion of memory assigned to an external line is a voice port capable of interfacing with a circuit switched telephone trunk line. The number of physical telephone lines is a limitation on the number of voice ports. Therefore, there is a need for such an ACD to be able to route contacts in other formats, without occupying a voice port. In this way, it will be possible to make more efficient use of the voice ports.

In an embodiment of the invention, the routing is accomplished by using a "media-port" to emulate the operations of a voice port in the ACD system. The novel system includes allocation of memory resources, and initialization of system data in order to satisfy the operating requirements of an existing ACD system. Upon receipt of a request for a media-port from a host computer, the ACD assigns and initializes a selected portion of computer memory to appear like a voice port. The existing ACD can then function similarly for telephone and non-telephone contacts.

The features of the present invention which are believed to be novel are set forth below with particularity in the appended claims. The invention, together with further advantages thereof, may be understood by reference to the following description in conjunction with the accompanying figures, which illustrate some embodiments of the invention.

DETAILED DESCRIPTION

Figure 1:
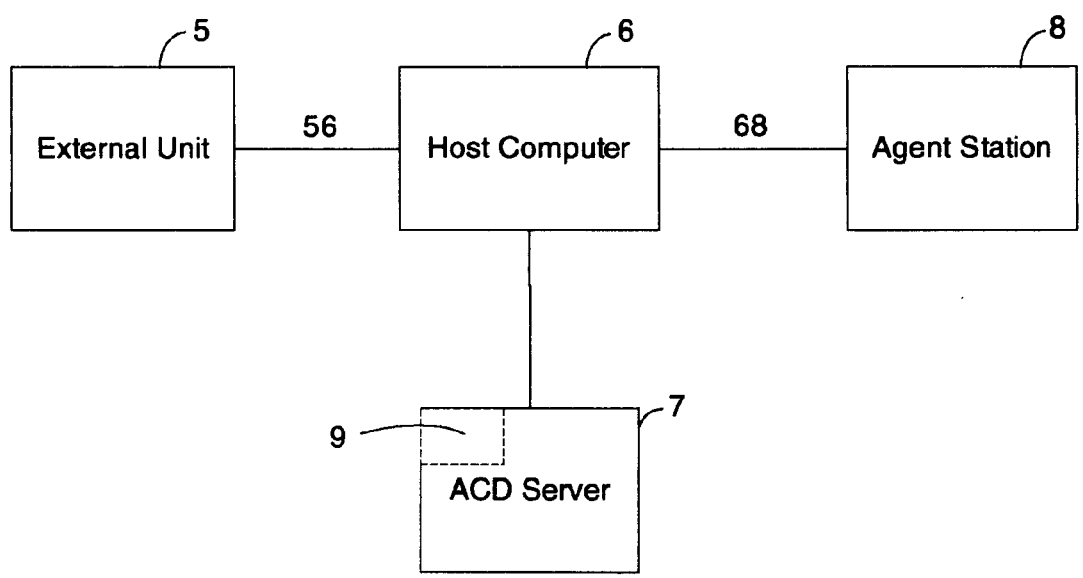
FIG. 1 is a functional block diagram illustrating an example of communication between an external unit, a host computer, an ACD, and an agent station.

FIG. 1 is a functional block diagram illustrating an example of communication between an external unit 5, and host computer 6, an automatic call distribution (ACD) server 7, and an agent station 8. The ACD server 7 routes a contact from an external unit 5 to an agent at an agent station 8. The agent can be one of a plurality of agents at a plurality of agent stations 8. Obviously, there could be any number of external units 5.

In general, the contact can be a telephone call via circuit switched telephone connections, or it can be a non-circuit switched contact. With a circuit switched telephone connection, a dedicated channel (or circuit) is established for the duration of the telephone call. A non-circuit switched contact refers to any other type of contact. The host computer 6 in FIG. 1 illustrates the computer functionality of a data link with an external unit 5 and a data link with an agent station 8. A circuit switched telephone connection with an external unit 5 would be directly with ACD server 7, and a circuit switched telephone connection with an agent station 8 would be directly with ACD server 7. Those circuit switched telephone communication routes are not illustrated in FIG. 1.

In the example of FIG. 1, communication 56 between external unit 5 and host computer 6 and communication 68 between host computer 6 and an agent station 8, can include any one or a combination of data links. Such communication can be through a private network and/or a public network. Such communication can include hardwire and/or wireless communications. E-mails, web callbacks, and web chat contacts are some examples of the types of contacts which might be made with external unit 5 in the FIG. 1 illustration.

ACD server 7 functions to find an available agent station 8 for a contact with an external unit 5. In the example of FIG. 1, ACD server 7 communicates with host computer 6, and host computer 6 communicates with external unit 5 and with agent station 8. In other embodiments, some or all computer communication functions performed by host computer 6 in the example of FIG. 1 could be viewed as being part of the computer functions performed by ACD server 7. Furthermore, the overall system can require other computer capabilities such as accessing a customer file database, or decision making regarding the type of treatment for a particular contact (typically configurable by an organization operating the ACD 7). In different embodiments, these other computer capabilities can be viewed as residing in different locations, such as separate computers not shown in FIG. 1, ACD server 7, or host computer 6.

Figure 2:
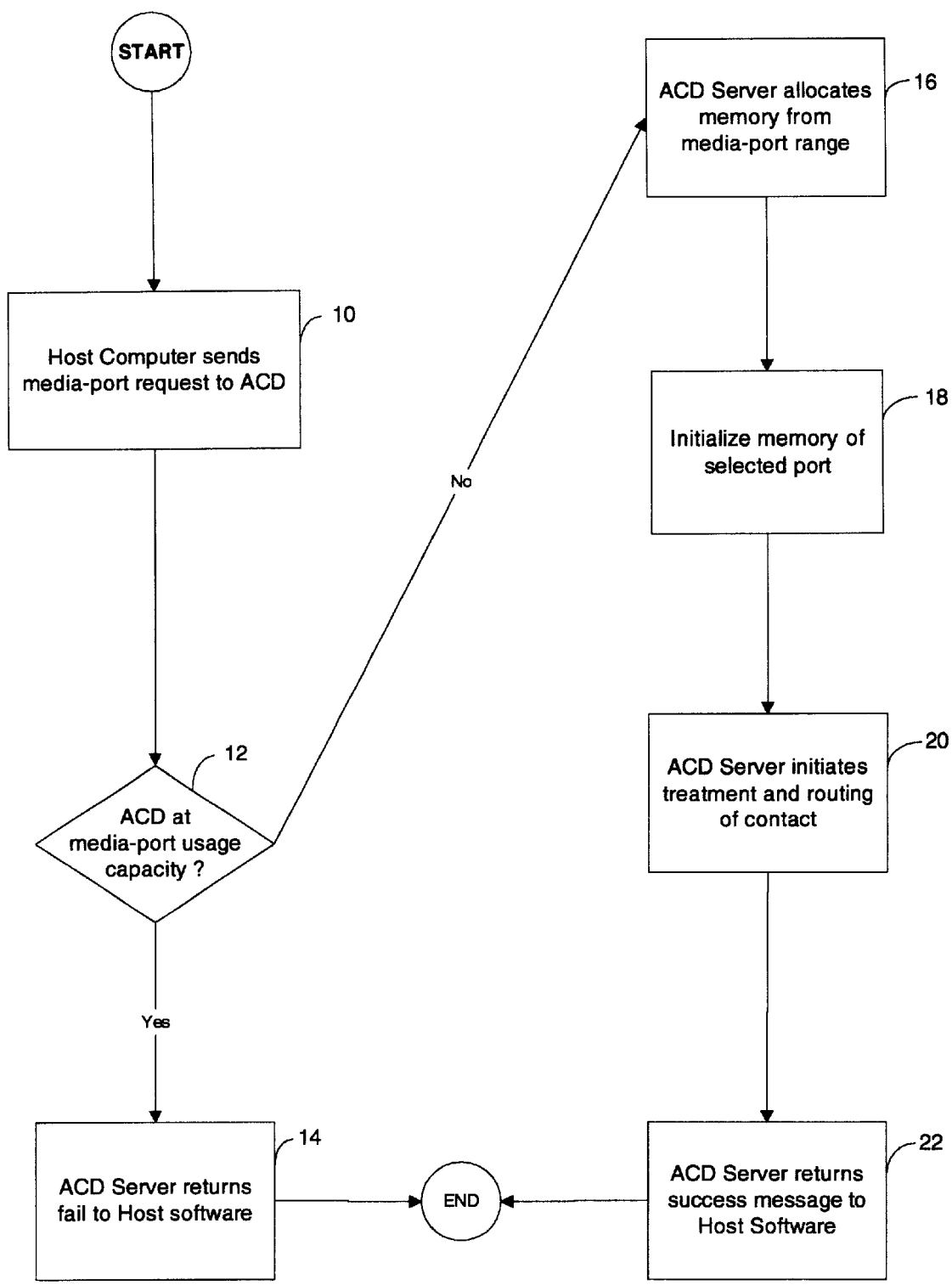
FIG. 2 is a flow chart illustrating an example of establishing a media-port.

FIG. 2 is a flow chart illustrating an example of establishing a media-port in accordance with the present invention. In many existing systems, ACD server 7 must select and initialize a portion of computer memory as a voice port assigned to each circuit switched telephone trunk line. Initialization of a voice port can include a variety of information such as port signalling functions, class of service, and physical and logical device type. Port signalling functions refers to initializing the port to accept different signalling functions (such as indications that there is a telephone call or that a telephone call is concluded) to change the state of the port. Trunk class of service refers to various conditions or limitations on use of the port such as for outbound use. Some examples are: an algorithm for selecting a line for outbound use, no outbound use, no long distance, only 911, etc. Device type refers to characteristics such as analog or digital, and to a signalling interface protocol such as in-band or out-of-band.

By use of a "media-port," the existing ACD server 7 can be adapted to provide the same functionality and the same routing for non-circuit switched contacts and as for circuit switched telephone calls, without occupying one of a limited number of voice ports. As seen in box 10 of FIG. 2, host computer 6 can send a media-port request to ACD server 7 upon occurrence of a contact with an external unit 5.

In one embodiment, the request from the host computer 6 can include certain data such as identification of contact treatment or a message for the agent. The contact treatment chosen could depend on information discernible in the host computer 6, such as the type of contact, a computer address of the external unit 5, or the organization's computer address which was contacted. The computer address contacted can be related to a separate function of the organization such as sales, customer technical service, account maintenance, and so forth.

Continuing with box 12 of FIG. 2, in one embodiment ACD server 7 can determine whether the system is at capacity or can handle another media-port. If the system is at capacity, a fail message can be returned to the host computer 6, as seen in box 14. Alternatively, ACD server 7 can assign and initialize a selected portion of memory 9 from a range reserved for media-ports, as seen in boxes 16 and 18 in the example of FIG. 2. Memory 9 is shown as part of ACD server 7 in the example of FIG. 1, but it could be located in host computer 6 or different locations (such as separate computers not shown) in other embodiments. In another embodiment, there would not be distinct ranges of memory only for media-ports.

The initialization of the selected portion of memory 9 can include a variety of trunk emulation information (mentioned above) so that the media-port can substitute for a voice port in the existing ACD server 7. In some embodiments, initialization can include information dependent on the contact type. In one embodiment, "media port"—or the absence of an association of the port with a circuit switched telephone connection—can be an initialization condition such as a device type. Such an initialization condition could be in addition to or in lieu of using a distinct range of memory only for media-ports.

Continuing with box 20 of FIG. 2, in one embodiment ACD server 7 can then issue a signal to initiate treatment and routing of the contact. The contact treatment can be a list of instructions, typically configurable by the organization operating the ACD 7, which define how the contact is treated. One example of contact treatment can be simply routing the contact to an available agent in accordance with a chosen algorithm. Other examples can include preceding routing with a programmed script, or preceding routing with a programmed script only until an agent is available. Examples of a programmed script could include announcements, or could include inquiries to which a response can be provided. The contact treatment also can depend on responses received to programmed inquiries.

Continuing with box 22 of FIG. 2, in one embodiment ACD server 7 can return a success message to host computer 6 after initiating treatment of the contact. In other embodiments, there might not be a success message, or a success message could be sent at a different time in the process—such as after determination that there is capacity for another media-port.

Figure 3:
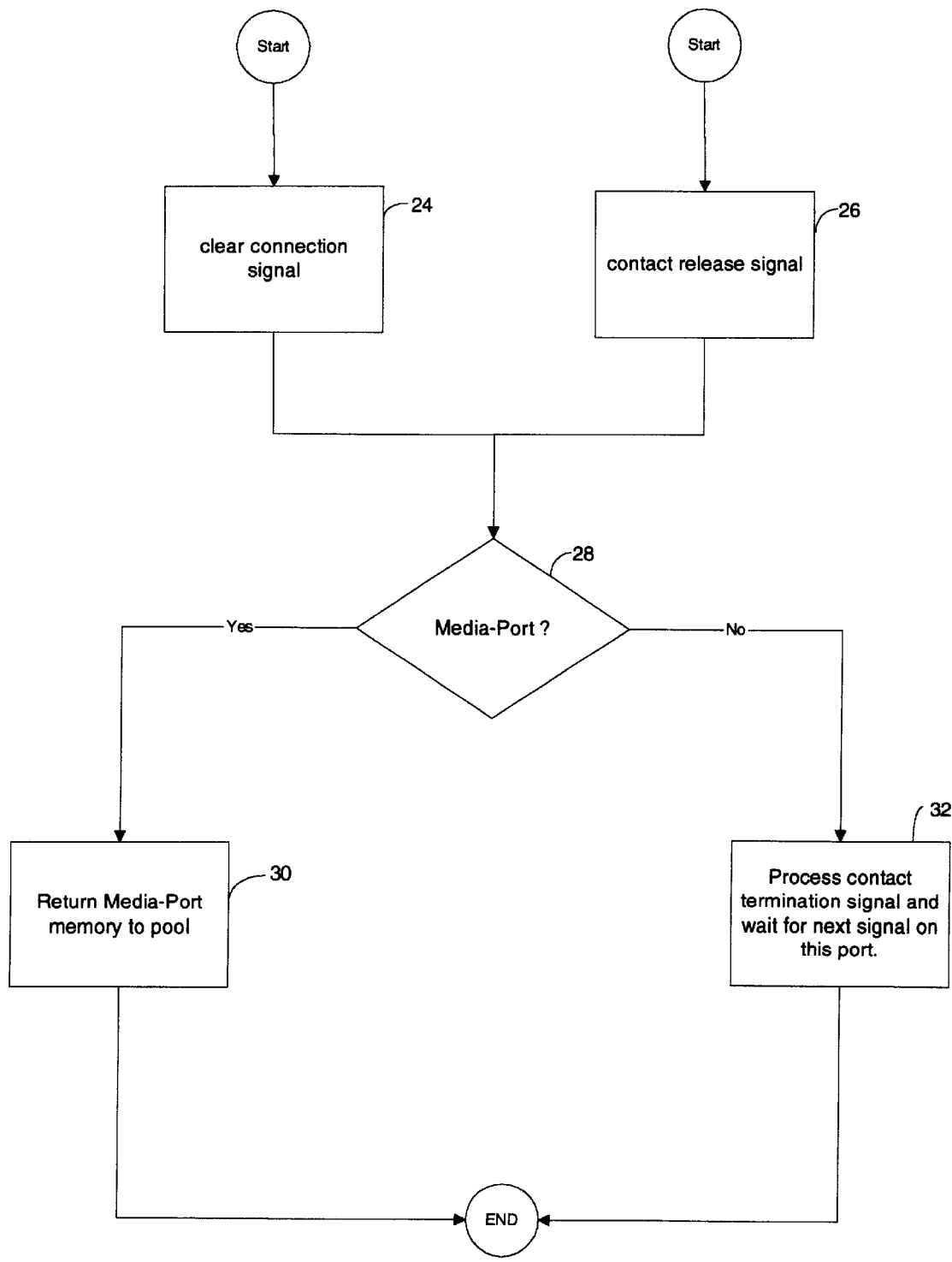
FIG. 3 is a flow chart illustrating an example of ACD operation upon an indication of contact termination.

FIG. 3 is a flow chart illustrating an example of ACD operation upon an indication of contact termination, in accordance with the present invention. Termination of a contact can be indicated by an ACD contact release signal resulting from an action by the agent, as seen in box 26. Termination of a contact also can be indicated by a clear connection signal resulting from an external action (e.g., a web caller clicking cancel), as seen in box 24. In the context of a circuit switched telephone line, there could be a trunk line disconnect if, for example, the caller hung up. In other contact formats, host computer 6 could send a clear connection request to ACD server 7 if the contact was terminated from the external unit.

In the example of FIG. 3, ACD server 7 can respond differently to a contact termination signal, depending on whether the associated port is a media-port, as seen in box 28. In the case of a voice port, the response to a contact termination signal issued in ACD server 7 can be that the state of the applicable voice port can change to idle, until the next signal such as a new telephone call on the circuit switched telephone line associated with that voice port. This is seen in box 32 of FIG. 3. In the case of a media-port, the response to a contact termination signal from host computer 6 can be that the selected portion of memory 9 is released, as seen in box 30 of FIG. 3. In an alternative embodiment, a media-port could be treated like a voice port upon contact termination—that is, retained in an idle state until the next contact for example.

The embodiments discussed and/or shown in the figures are examples. They are not exclusive ways to practice the present invention, and it should be understood that there is no intent to limit the invention by such disclosure. Rather, it is intended to cover all modifications and alternative constructions and embodiments that fall within the scope of the invention as defined in the following claims:

What is claimed is:

1. A method of accomplishing routing of a non-circuit switched contact in a circuit switched telephony-based automatic call distribution (ACD) system, the ACD designed to assign a voice port to any circuit switched telephone line, the method comprising:

requesting assignment of a media-port for the contact;

assigning a selected portion of computer memory as the media-port, the media-port not being associated with a circuit switched telephone line; and initializing the selected portion of memory to emulate a voice port.

2. The method as in claim 1, further comprising determining whether usage capacity for another media-port exists, and proceeding to the assigning and initializing steps only if the capacity exists.

3. The method as in claim 1, further comprising initiating treatment and routing of the contact.

4. The method as in claim 1, further comprising issuing a success message indicating capability of assigning the media-port.

5. The method as in claim 1, wherein the contact is communicated at least in part via a hardwire communication link.

6. The method as in claim 1, wherein the contact is communicated at least in part via wireless communication.

7. The method as in claim 1, wherein the contact is communicated via the Internet.

8. The method as in claim 1, wherein the portion of computer memory is selected from a range reserved for media-ports.

9. The method as in claim 1, wherein initialization information is used in the initializing step, and wherein at least one category of the initialization information is selected from a group consisting of: port signalling functions, class of service, device type, and contact type.

10. The method as in claim 1, wherein initialization information is used in the initializing step, and wherein the initialization information comprises a condition of the media-port not being associated with a circuit switched telephone line.

11. The method as in claim 1, wherein the requesting step includes providing at least some information selected from a group consisting of: identification of a contact type, identification of a contact treatment, a message for an agent, a computer address of an origin of the contact, and a computer address being contacted.

12. The method as in claim 1, the contact being one of a group consisting of: an e-mail contact, a web callback contact, a web chat contact, a facsimile contact, a video contact, and a web telephony voice contact.

13. The method as in claim 1, further comprising signalling contact termination upon termination of the contact.

14. The method as in claim 1, further comprising releasing the selected portion of memory after termination of the contact.

15. An apparatus for accomplishing routing of a non-circuit switched contact in a circuit switched telephony-based automatic call distribution (ACD) system, the ACD designed to assign a voice port to any circuit switched telephone line, the apparatus comprising:

a host computer capable of communicating with at least one external unit, capable of communicating with at least one ACD agent station, and configured to request assignment of a media-port by the ACD;

a portion of computer memory which is assigned as the media-port and initialized to emulate a voice port, the portion of memory not being associated with a circuit switched telephone line.

16. The apparatus as in claim 15, further comprising a hardwire communication link between the host computer and the ACD agent.

17. The apparatus as in claim 15, wherein the portion of computer memory is selected from a range reserved for media-ports.

18. The apparatus as in claim 15, wherein the portion of computer memory is initialized with at least one category of initialization information selected from a group consisting of: port signalling functions, class of service, device type, and contact type.

19. The apparatus as in claim 15, wherein the portion of computer memory is initialized with an initialization condition of the media-port not being associated with a circuit switched telephone line.

20. The apparatus as in claim 15, wherein the host computer is configured to provide at least some information selected from a group consisting of: identification of a contact type, identification of a contact treatment, a message for an agent, a computer address of an origin of the contact, and a computer address being contacted.

21. The apparatus as in claim 15, the contact being one of a group consisting of: an e-mail contact, a web callback contact, a web chat contact, a facsimile contact, a video contact, and a web telephony voice contact.

22. The apparatus as in claim 15, wherein the portion of computer memory is capable of being released after termination of the contact.

23. An apparatus for accomplishing routing of a non-circuit switched contact in a circuit switched telephony-based automatic call distribution (ACD) system, the ACD designed to assign a voice port to any circuit switched telephone line, the apparatus comprising:

means for requesting assignment of a media-port for the contact;

means for assigning a selected portion of computer memory as the media-port and for initializing the selected portion of memory to emulate a voice port, the media-port not being associated with a circuit switched telephone line.

24. The apparatus as in claim 23, further comprising means for determining whether usage capacity for another media-port exists, wherein the assigning and initializing means acts only if the capacity exists.

25. The apparatus as in claim 23, further comprising means for initiating treatment and routing of the contact.

26. The apparatus as in claim 23, further comprising means for issuing a success message indicating capability of assigning the media-port.

27. The apparatus as in claim 23, further comprising means for signalling contact termination upon termination of the contact.

28. The apparatus as in claim 23, further comprising means for releasing the selected portion of memory after termination of the contact.

* * * * *